Jan. 15, 1963 W. H. ELLIOT ET AL 3,073,244
CONDITION RESPONSIVE FLUID FLOW MONITORING AND CONTROL SYSTEM
Filed June 29, 1960 2 Sheets-Sheet 1

3,073,244
CONDITION RESPONSIVE FLUID FLOW MONITORING AND CONTROL SYSTEM
William H. Elliot, Milwaukee, and Gerald L. Yager, Menomonee Falls, Wis., assignors to Cutler-Hammer, Inc., Milwaukee, Wis., a corporation of Delaware
Filed June 29, 1960, Ser. No. 39,640
22 Claims. (Cl. 103—25)

This invention relates to condition responsive fluid flow monitoring and control systems and more particularly to fluid flow detecting systems for monitoring and controlling such fluid flow.

While not limited thereto, the invention is especially applicable to monitoring oil flow from an oil well head and for controlling the pumping of oil from a well in response to such flow.

In the pumping of oil from a well, programmed controllers have been employed to control pumping during predetermined productive intervals and to stop pumping during predetermined, alternate non-productive intervals. These productive and non-productive intervals are estimated or determined experimentally and a program device is preset to start and stop pump operation at certain times of the day. As oil well characteristics vary from one well to another and the characteristics of a given well may be erratic or change over a period of time, programmed controllers have also been employed to start pump operation at certain times of the day and automatically to stop pump operation following each such starting thereof in response to pump-off of the well. "Pump-off" is defined as that temporary condition or state of a well reached when the accumulation of oil at the bottom of the well has been pumped off and further pumping yields only a negligible flow. The advantage of continuing pumping until pump-off is clear in that maximum production is obtained thereby. Also, the advantages of stopping pump operation in response to pump-off until the next pumping cycle reside in saving electrical power and avoiding needless wear on the apparatus.

It has been found desirable to provide improved fluid flow programmed control means capable of accurate response and operation under widely varying and extreme temperature, oil and climatic conditions. It has also been found desirable to incorporate in such control means, in addition to a feature providing starting of pumping at preset times of the day and automatic stopping of each pumping cycle in response to pump-off, the further feature of control means for providing definite recovery time operation. "Recovery time" is defined as that period following a pumping period during which a well is allowed to refill before the next pumping cycle is initiated.

An object of the invention is to provide an improved condition responsive fluid flow monitoring and control system.

A more specific object of the invention is to provide an improved system for monitoring and controlling fluid pumping in response to a characteristic of the flow.

Another object of the invention is to provide improved means for detecting decrease in fluid flow and for stopping pumping of such fluid in response thereto.

Another object of the invention is to provide improved means for detecting change in fluid flow which means is not affected by external conditions such as ambient temperature and the like and for controlling such fluid flow in response thereto.

Another object of the invention is to provide improved means for controlling a fluid pump motor and having fail-safe means whereby failure of any one of a plurality of control elements effects stopping of the pump motor.

Another object of the invention is to provide such fluid responsive means for controlling a fluid pump to maintain the latter operating as long as fluid is being pumped at or above a predetermined rate and for stopping the pump when fluid is not being pumped or is being pumped below said predetermined rate.

Another object of the invention is to provide such fluid responsive means in an improved program clock initiation oil well pump-off controller which functions to start pumping cycles at predetermined settable times and functions to stop each pumping cycle when a pump-off condition occurs following each starting thereof.

Another object of the invention is to provide such fluid responsive means in an improved definite recovery time oil well pump-off controller which functions to control pumping cycles and to stop the same when a pump-off condition occurs after the start of each such cycle and to measure a predetermined settable well recovery time period after each pumping cycle is stopped and to restart a pumping cycle after each such time period.

Another object of the invention is to provide improved means for detecting a pump-off condition by detecting amplitude decrease below a predetermined adjustable value in cyclic temperature pulses derived from pulsating fluid flow to afford a direct measure of the fluid flow whereby the detection of the pump-off condition is not affected by constant or variable external conditions such as ambient temperature and the like.

In accordance with the invention, there is provided an improved fluid flow responsive programmed control system affording two, alternative methods of oil pumping control. The first method is identified as program clock initiation and is applicable to wells having substantially constant and consistent, combined pumping and recovery times from each pumping period to the next. A timing device such as a clock or the like is preset to control starting of a pump periodically at certain times of a day. The clock is also preset to maintain pumping control for a predetermined initial time interval of the order of fifteen minutes following each starting thereof. As soon as oil begins to flow, pumping control is transferred from the clock to a pump-off controller which then controls pumping as long as sufficient oil is available to maintain a predetermined flow past a probe. When pump-off occurs, the controller will stop the pump and transfer control thereof back to the clock. The pump will then remain inactive until the next starting time is reached. In this manner, the clock runs continuously and repeats the control cycle precisely. Well characteristics are determined experimentally and the controller is preset in accordance therewith. The second method is identified as definite recovery time operation and is particularly suitable for use with wells having erratic characteristics such as, for example, where the length of time required to reach pump-off varies through a plurality of pumping cycles. As the total time afforded by the controller for each successive pumping cycle and recovery period is constant, such variation might decrease the time that is left for recovery. To afford adequate time for recovery, the recovery periods are timed. The timing device is preset to maintain each pumping control for a predetermined initial time interval, to control starting of the pump after additional constant timed intervals and the controller functions to control pumping and to stop the pump when pump-off occurs as described in connection with the first method. However, the timing device is not preset to run continuously. Instead, the timing device is caused to stop timing after each predetermined initial time interval of the order of fifteen minutes, oil flow during this interval having caused transfer of pumping control from the timing device to the pump-off controller which then controls pumping as long as sufficient oil is available to maintain a predetermined flow past a probe. When pump-off occurs, the controller restarts the timing device to time the aforementioned additional interval constituting the recovery period of the well and stops the pump and transfers control of the latter back to the timing device. The pump will then remain inactive until the recovery period has been timed and the timing device acts at the end of the recovery period to start another pumping cycle. This insures adequate recovery periods regardless of the durations of the respective immediately preceding pumping cycles. With the use of this method, the times at which pumping is started following initial starting are determined, not by the time of day, but by previous well production and the timing device is preset accordingly. The system detects pump-off conditions by detecting amplitude decrease below a predetermined adjustable value in cyclic temperature pulses derived from pulsating oil flow to afford a direct measure of oil flow. Consequently, the detection of pump-off conditions is not influenced by external conditions such as ambient temperature and the like. The pump-off controller incorporates failsafe features whereby the pump motor is automatically stopped in response to failure of any one of a plurality of circuit components therein.

The aforementioned and other objects and advantages of the invention and the manner of obtaining them will best be understood by reference to the following detailed description of an exemplary embodiment of a condition responsive fluid flow monitoring and control system taken in conjunction with the accompanying drawings wherein.

Figure 1:
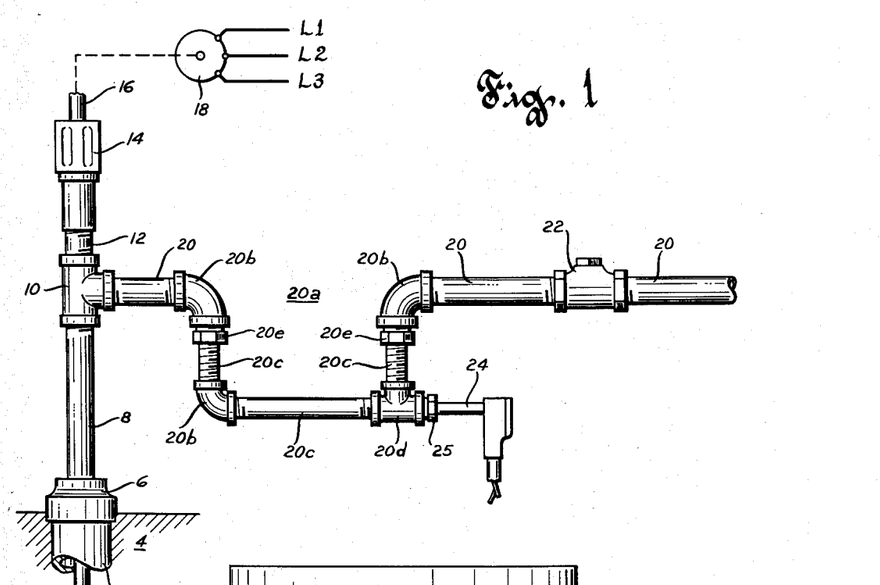
FIGURE 1 is a partly schematic elevational view showing a portion of an oil well and pumping installation constructed in accordance with the invention.

Referring to FIG. 1, there is shown an oil well installation comprising a well casing 2 sunk into the ground which is indicated generally as 4. A reducing cap 6 is secured to the upper end of casing 2 and is connected through a short section of pipe 8 to a pump T 10. Another short section of pipe 12 connects the other side of the pump T to a stuffing box 14. As will be apparent, pipe sections 8 and 12, the double-ended portion of the pump T and stuffing box 14 are linearly connected in series to one another and are held coaxial relative to well casing 2 by reducing cap 6 to accommodate a polish rod 16 therethrough. The upper end of polish rod 16 is connected to and is reciprocatingly operable by an alternating current induction motor 18 or the like connectable for energization through lines L1, L2 and L3 to a three phase alternating current power supply source of 440 volts or the like. Polish rod 16 extends through casing 2 and is adapted to drive a reciprocating pump or the like which is located at the bottom of the well which produces a pulsating flow of oil from the well.

A lead line 20 in the nature of an oil conduit or pipe having a check valve 22 connected therein extends horizontally from pump T 10 to convey the oil to storage facilities or the like. The section of lead line 20 between pump T 10 and check valve 22 immediately adjacent the pump T is provided with an oil trap comprising a U-shaped portion 20a of predetermined flow capacity relative to the flow capacity of lead line 20, the flow capacity of the U-shaped portion being determined by the temperature of the oil at the probe and the rate of flow thereof produced by the pump. U-shaped portion 20a may be constructed in a suitable manner with interconnected elbows 20b and nipples 20c and a pipe T 20d, the latter constituting the angle at the bottom, exit side of U-shaped portion 20a and affording a horizontal opening into the bottom of the U-shaped portion for accommodating a probe 24 hereinafter described. If the U-shaped portion of lead line 20 is provided with smaller fluid flow capacity than the remainder of the lead line, suitable reducing bushings 20e may be employed between appropriate elbows and nipples.

Figure 2:
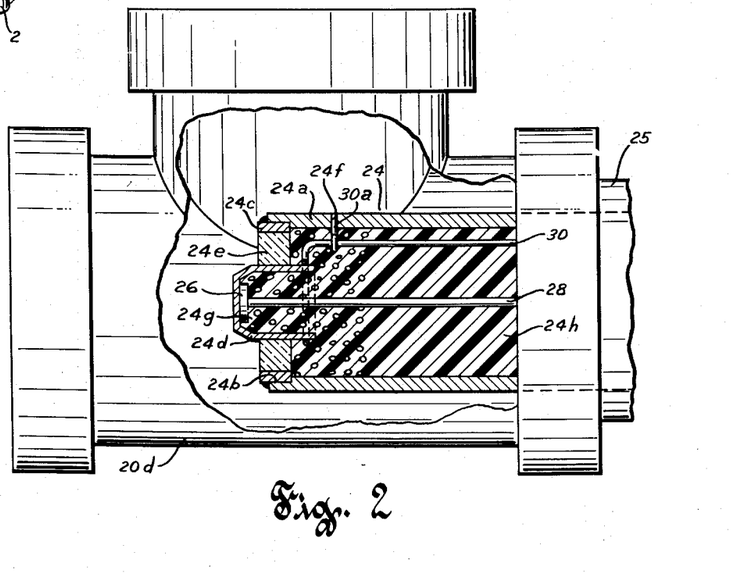
FIG. 2 is an enlarged fragmentary cross-sectional view of a portion of the structure of FIG. 1 showing a probe installation.
Figure 3:
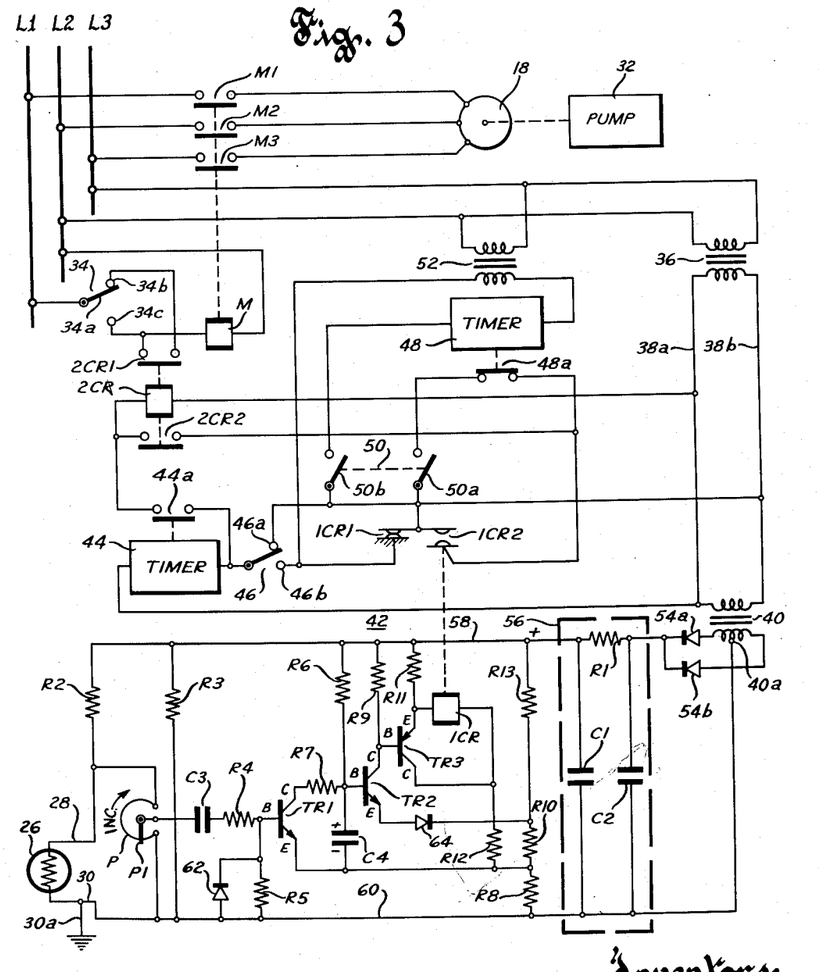
FIG. 3 is a diagrammatic illustration of a pump motor control system constructed in accordance with the invention.

The enlarged cross-sectional view in FIG. 2 more clearly shows the probe structure and its installation. Pipe T 20d is arranged as in FIG. 1. A reducing bushing 25 is threaded into the remaining opening in pipe T 20d and probe 24 is threaded into such bushing. Probe 24 is of elongated tubular form and the probe tip end thereof extends substantially beyond the midpoint within pipe T 20d from the exterior of the latter to contact the pulsations of oil flowing therethrough. Probe 24 is provided with a tubular casing 24a of electrical conducting material such as Monel metal or the like. The extreme end of casing 24a within pipe T 20d is provided with a short internal bore 24b of larger diameter than the remainder of the bore in the casing for accommodating a probe tip assembly against the shoulder between such bores. The probe tip assembly comprises a mounting ring 24c of Monel metal or the like rigidly secured as by soldering within bore 24b in hermetically sealing engagement with casing 24a. A hollow, thin walled, cup-shaped member 24d of electrical conducting material having good thermal conductivity such as stainless steel or the like is hermetically sealed coaxially within ring 24c by electrical insulating material such as glass 24e or the like. A temperature responsive resistance device such as a thermistor 26, shown in FIG. 2, and shown diagrammatically in FIG. 3, is mechanically and electrically connected to the inner surface of the flat bottom wall of member 24d, shown in FIG. 2, by solder or the like so as to be in good thermal and electrical conductivity relation with member 24d. A pair of electrical conductors 28 and 30 extend from the exterior through casing 24a. Conductor 28 is connected to one side of thermistor 26. Conductor 30 is connected to member 24d around the rim thereof and is suitably grounded by a branch conductor 30a secured as by soldering into a hole 24f in casing 24a, such solder hermetically sealing hole 24f. The interior of member 24d and the adjacent end of the bore within casing 24a is filled with a thermal insulating material 24g such as foam epoxy or the like and the remainder of the bore within casing 24a is filled with solid material 24h such as an epoxy resin or the like, materials 24g and 24h being filled into the bore within casing 24a in a fluid state and being electrically insulating.

The purpose of the oil trap comprising U-shaped portion 20a in lead line 20 is to keep the probe tip under the oil at all times. In this manner, the pulsating oil flow intermittently cools the thermistor. While the probe has been shown as preferably mounted at the lowermost portion of the exit side of the oil trap, it will be apparent that it could also be mounted at other portions of the exit side of the oil trap wherein it remains under the flowing oil.

Referring to FIG. 3, there is shown a control system for motor 18 which operates the aforementioned reciprocating pump 32. Motor 18 is connectable to power supply lines L1, L2 and L3 through normally open contacts M1, M2 and M3 of a main power contactor M. The operating coil of contactor M is energizable across lines L1 and L2 through a double-throw switch 34 having a movable contact 34a operable to engage a stationary contact 34b for automatic operation or a stationary contact 34c for manual operation. The movable contact 34a of switch 34 is connected to line L1, stationary contact 34c is connected directly through the operating coil of contactor M to line L2 and stationary contact 34b is connected through a normally open contact 2CR1 of a control relay 2CR and then through the operating coil of contactor M to line 2. As will be apparent, switch 34 is manually operable to contact 34c to afford manual control of the energization of the operating coil of contactor M and is alternatively operable to contact 34b to set the system for automatic operation hereinafter described.

Lines L2 and L3 are connected across the primary winding of a transformer 36, the secondary winding of which is connected through conductors 38a and 38b across the primary winding of a transformer 40. Transformer 36 is employed to decrease the supply voltage to 110 volts or the like and transformer 40 further decreases the voltage to a value suitable for energizing the pump-off control system indicated generally as 42.

A timer 44 is connected to conductor 38a and through a normally closed contact 46a of a double through switch 46 to conductor 38b, there being a normally closed contact 1CR1 of a control relay 1CR between normally open contact 46b of switch 46 and conductor 38b. The operating coil of relay 2CR is connected to conductor 38a and through a normally open contact 44a of timer 44 and then through contact 46a of switch 46 to conductor 38b. A maintaining circuit extends from the junction between the operating coil of relay 2CR and contact 44a through a normally open contact 2CR2 of relay 2CR and then in one branch through a normally open contact 1CR2 of control relay 1CR to conductor 38b and in another branch through a normally closed contact 48a of an auxiliary timer 48 and normally open contact 50a of a switch 50 to conductor 38b. The primary winding of a transformer 52 is connected across lines L2 and L3. One end of the secondary winding of transformer 52 is connected through contact 1CR1, a normally open contact 50b of switch 50 and timer 48 to the other end of the secondary winding. Contacts 1CR1 and 1CR2 of relay 1CR are constructed so that contact 1CR2 closes before contact 1CR1 opens in response to energization of its operating coil and contact 1CR1 closes before contact 1CR2 opens in response to deenergization of its operating coil to prevent uncontrolled deenergization of timer 44. Switch 46 is of the manually operable double throw type and is provided for selectively by-passing contact 1CR1 in the operating position shown in FIG. 3. When actuated to its other position, switch 46 connects contact 1CR1 in series with timer 44 for deenergization under the control of contact 1CR1. Switch 50 is of the manually operable single throw type and is provided for connecting timer contact 48a in shunt of contact 1CR2 and for completing the circuit of timer 48 through contact 1CR1.

Pump-off control system 42 is energized from the secondary winding of transformer 40 through a full-wave rectifier comprising diodes 54a and 54b and a pi filter 56. For this purpose, the opposite ends of the secondary winding of transformer 40 are connected through unidirectional diodes 54a and 54b, respectively, of the full-wave rectifier to one side of filter 56. Filter 56 comprises a resistor R1 connected between the common junction of diodes 54a and 54b and a positive voltage common conductor 58 and a pair of capacitors C1 and C2 respectively, connected from opposite ends of resistor R1 to a negative voltage common conductor 60 which extends through the other side of filter 56 to a center tap 40a on the secondary winding of transformer 40. Probe thermistor 26 is connected at one side through the aforementioned conductor 28 and a resistor R2 to common conductor 58. Conductor 30 which is electrically connected to the other side of thermistor 26 is grounded through branch conductor 30a and connected directly to common conductor 60.

It will be apparent that series connected resistor R2 and thermistor 26 constitute a voltage divider which is supplied from common conductors 58 and 60. Thermistor 26 is constructed of electrical resistance material having a negative temperature coefficient of resistance whereby it exhibits a decrease in resistance to current flow upon being heated by current flow therethrough and an increase in resistance to current flow upon being cooled by the oil. While the fluid flow detecting or sensing device has been illustrated and described as a thermistor 26, the invention contemplates the use of any device which provides an electrical output signal variable in proportion with the pulsating flow of fluid in place of the thermistor. For example, a fluid flow detecting device such as a voltaic device that produces a voltage in proportion to the amount of heating or a device whose resistance varies with pressure or other similar device could be employed in the system.

The junction of resistor R2 and thermistor 26 is connected through the resistor of a sensitivity adjusting potentiometer P to common conductor 60 whereby potentiometer P is arranged parallel to thermistor 26 and is selectively adjustable to afford a voltage proportional to the voltage across thermistor 26. A bleeder resistor R3 is connected across conductors 58 and 60 in parallel with the voltage divider comprising resistor R2 and thermistor 26 to reduce supply voltage variation thereacross. Movable tap P1 of potentiometer P is connected through a coupling capacitor C3 and a resistor R4 in series to a control electrode such as base B of a controllable solid element semi-conductor device such as a transistor TR1 of the N-P-N conductivity type or the like. Common conductor 60 is connected through a unidirectional conducting diode 62 to the junction between resistor R4 and base B to provide a discharge path for capacitor C3. A resistor R5 of relatively high resistance value is connected across diode 62 for reasons hereinafter described. A main conducting path for transistor TR1 extends from positive conductor 58 through resistors R6 and R7, collector C and emitter E of transistor TR1 and resistor R8 to negative conductor 60. A storage capacitor C4 is connected in shunt of resistor R7 and the collector-emitter junction of transistor TR1.

A second controllable solid element semi-conductor device such as a transistor TR2 of the N-P-N conductivity type or the like is arranged to be controlled by capacitor C4. To this end, the common junction between resistors R6 and R7 and capacitor C4 is connected directly to the control electrode such as base B of transistor TR2. A main conducting path for transistor TR2 extends from positive conductor 58 through resistor R9, collector C and emitter E of transistor TR2, a unidirectional conducting diode 64 and resistors R10 and R8 to negative conductor 60.

A third controllable solid element semi-conductor device such as a transistor TR3 of the P-N-P or opposite conductivity type or the like is arranged to be controlled by transistor TR2. To this end, collector electrode C of transistor TR2 is connected directly to the control electrode such as base B of transistor TR3. A main conducting path for transistor TR3 extends from positive conductor 58 through a resistor R11, emitter E and collector C of transistor TR3 and resistors R12 and R8 to negative conductor 60. The operating coil of the aforementioned control relay 1CR is connected across the emitter-collector junction of transistor TR3 for energization whenever transistor TR3 is rendered non-conducting. A voltage divider circuit comprising a resistor R13 and the aforementioned resistors R10 and R8 in series in that order extends from conductor 58 to conductor 60.

The operation of the system will now be described. When power is connected to supply lines L1, L2 and L3, transformer 36 is energized across lines L2 and L3 to apply a reduced voltage to conductors 38a and 38b. As a result, transformer 40 is energized to apply full-wave rectified voltage across conductors 58 and 60, this voltage being suitably reduced by transformer 40 to supply pump-off control system 42. The primary winding of transformer 52 is energized across lines L2 and L3.

Current flows from the left-hand end of the secondary winding of transformer 40 through diode 54a and filter 56 to conductor 58 and from conductor 60 to center tap 40a of the secondary winding. Each alternate half-cycle, current flows from the right-hand end of the secondary winding of transformer 40 through diode 54b and filter 56 to conductor 58 and from conductor 60 to center tap 40a of the secondary winding. Thus, the alternating voltage from conductors 38a and 38b is suitably reduced by transformer 40, rectified by rectifier 54 and filtered by filter 56 to supply a non-pulsating unidirectional voltage across positive and negative conductors 58 and 60.

Current flows from conductor 58 to conductor 60 through a plurality of branches. Current flows through voltage divider resistors R13, R10 and R8. Current also flows through resistors R11, R12 and R8 to energize the operating coil of relay 1CR. A reference potential is applied from the junction between resistors R8 and R10 to emitter E of transistor TR1 normally to bias the latter to its con-conducting condition in the absence of an input signal voltage, such reference potential being positive relative to the potential of base B of transistor TR1 which is held at the potential of conductor 60 through the relatively high resistance of resistor R5. Emitter E of transistor TR2 is held at a potential not higher than the potential at the junction between resistors R13 and R10 whereas the potential of base B of transistor TR2 is controlled by capacitor C4.

In view of the non-conduction of transistor TR1, current flows through resistors R6 and R8 to charge capacitor C4. The ultimate positive capacitor voltage is applied to base B of transistor TR2 to render the latter conducting in a circuit from conductor 58 through resistor R9, collector-emitter junction C–E, diode 64 and resistors R10 and R8 to conductor 60. Such current flow through resistor R9 causes the voltage at base B of transistor TR3 to go negative, that is to decrease, relative to the voltage at emitter E thereof to render transistor TR3 conducting in shunt of the operating coil of relay 1CR. It will be apparent that the resistance value of resistor R9 must be significantly larger than that of resistor R11 to maintain the base negative relative to the emitter following initiation of conduction of transistor TR3. Such conduction of transistor TR3 shunts the operating coil of relay 1CR to deenergize the latter.

Diode 64 functions to limit the inverse voltage across the base-emitter junction B–E of transistor TR2 when the voltage across capacitor C4 is low.

Current flows through resistor R2 and thermistor 26 to heat the latter to a predetermined temperature substantially above the temperature of the oil to be pumped past the probe. Resistor R3 is provided with a suitable value of resistance to divert some of the current from the thermistor circuit and thereby to minimize voltage variations between conductors 58 and 60. Current also flows through the resistor of potentiometer P in parallel with thermistor 26 and a selectively adjustable portion of the voltage across the thermistor is applied from the movable tap of the potentiometer to capacitor C3. However, capacitor C3 substantially blocks direct current flow in the circuit thereof whereby the system responds only to input voltage pulses of an alternating voltage nature.

The system is now ready for automatic operation assuming that switch 34 is set to contact 34b as shown in FIG. 3.

*Program Clock Initiation*

For this method of operation, switch 46 is set on contact 46a thereof to by-pass contact 1CR1 and switch 50 is left open as shown in FIG. 3. Timer 44 energizes through contact 46a of switch 46 across conductors 38a and 38b and eventually closes contact 44a in accordance with its setting. The operating coil of relay 2CR energizes through contact 44a in parallel with timer 44 and closes contacts 2CR1 and 2CR2. Contact 2CR1 energizes the operating coil of contactor M through switch 34 to close contacts M1, M2 and M3. As a result, motor 18 is connected through supply lines L1, L2 and L3 to the power supply source to start pump 32. Timer 44 runs continuously and is preset to maintain operation of motor 18 for an initial predetermined time interval of the order of fifteen minutes by maintaining contact 44a closed for this period of time. Timer 44 is also preset to reclose contact 44a for such time interval at certain times of the day.

When pump 32 causes oil to flow past the tip of probe 24, FIGS. 1 and 2, thermistor 26, FIGS. 2 and 3, is cooled by the oil to reduce its temperature and to increase its electrical resistance. It will be apparent that the reciprocating pump sends pulsations of oil past the probe tip. Each such oil pulse causes the temperature of thermistor 26 to drop and the temperature thereof is alternately increased between the oil pulses by the current flowing therethrough. As a result, the resistance of thermistor 26 increases and decreases in proportion to the oil pulses to provide a correspondingly alternating voltage across the resistor of potentiometer P. A portion of this alternating operating voltage is applied through capacitor C3, current limiting resistor R4 and resistor R8 across the base-emitter junction of transistor TR1. As capacitor C3 does not have time to charge in response to each positive excursion of the input voltage, the voltage at the junction of capacitor C3 and resistor R4 correspondingly increases and is applied through the latter to base B to render transistor TR1 conducting during each such positive excursion of the input voltage. Each such periodic conduction of transistor TR1 completes a discharge path through resistor R7 for capacitor C4 to discharge the latter. Any accumulation of charge on capacitor C3 is discharged during the alternate negative excursions of the voltage through potentiometer P, diode 62 and resistor R4.

A predetermined volume of pulsating oil flow past the probe maintains capacitor C4 discharged to render transistor TR2 non-conducting. As a result, transistor TR3 is also rendered non-conducting to effectively interrupt the shunt circuit across the operating coil of relay 1CR whereupon the latter energizes and closes contact 1CR2 and opens contact 1CR1. Contact 1CR2 completes a maintaining circuit for the operating coil of relay 2CR through contact 2CR2.

At the end of the initial fifteen minute time interval, timer 44 opens contact 44a to interrupt the original energizing circuit of the operating coil of relay 2CR. Thus, control of motor 18 has been transferred from timer 44 to relay 1CR of pump-off control circuit 42.

Motor 18 is maintained energized and pumping continues under the control of the pump-off control circuit as long as there is sufficient oil in the well for pump 32 to maintain a predetermined volume of pulsating flow past the probe comprising thermistor 26. When the flow pulses decrease below such predetermined value, for example, to a small or negligible value, the positive excursion of the operating voltage pulses applied to base B of transistor TR1 proportionately decrease in amplitude and duration. As a result, transistor TR1 conducts for shorter periods or ceases conducting altogether and capacitor C4 accumulates a charge to render transistor TR2 conducting. Conduction of transistor TR2 renders transistor TR3 conducting to shunt the operating coil of relay 1CR and to deenergize the latter. Contact 1CR2 interrupts the maintaining circuit of the operating coil of relay 2CR to deenergize the latter. Contact 2CR1 interrupts energization of the operating coil of contactor M to open contacts M1, M2 and M3 to disconnect motor 18 and stop the pump. Under this condition, timer 44 continues to run and operates in accordance with its setting to start another pumping cycle when the time therefor has been reached.

Alternatively, switch 50 may be closed to provide a time interval between the opening of contact 1CR2 and the deenergization of the operating coil of relay 2CR. This time interval prevents the pump from being stopped in the event gas or the like in the oil causes the operating coil of relay 1CR to be deenergized. Timer 48 is arranged to time whenever its operating circuit is closed and to open contact 48a at the end of a time interval of the order of one minute or the like. Also, timer 48 is arranged to be reset in response to deenergization thereof.

Closure of switch 50 causes energization of timer 48 in a circuit extending from the left-hand end of the secondary winding of transformer 52 through contact 1CR1 of relay 1CR, contact 50b of switch 50 and timer 48 to the righthand of the secondary winding. Contact 50a of switch 50 connects normally closed contact 48a of timer 48 in shunt of contact 1CR2 of relay 1CR.

When oil pulsations start to flow past the probe tip, the operating coil of relay 1CR energizes as hereinbefore described to close contact 1CR2 and to open contact 1CR1. Contact 1CR2 maintains the operating coil of relay 2CR energized as long as sufficient oil pulsations flow past the probe tip. Opening of contact 1CR1 interrupts the energizing circuit of timer 48 to cause the latter to be reset.

In the event gas bubbles in the oil cause deenergization of the operating coil of relay 1CR to close contact 1CR1 and to open contact 1CR2, the operating coil of relay 2CR remains energized through contacts 50a and 48a in shunt of contact 1CR2 and then through contact 2CR2. Closure of contact 1CR1 causes energization of timer 48 through contact 50b to start timing. When oil flow causes reenergization the operating coil of relay 1CR before the end of the time interval of the order of one minute, contact 1CR2 recloses to maintain relay 2CR and contact 1CR1 reopens to reset timer 48. Thus, intermittent deenergization of the operating coil of relay 1CR for periods of less than one minute does not cause interruption of the pump.

When pump-off occurs to deenergize the operating coil of relay 1CR, contact 1CR1 completes the energizing circuit of timer 48 and contact 1CR2 opens. At the end of the time interval of timer 48, contact 48a opens to interrupt the maintaining circuit of the operating coil of relay 2CR to stop the pump.

*Definite Recovery Time Operation*

For this method of operation, switch 46 is set into engagement with contact 46b and switch 50 is left open. Connection of power causes energization of timer 44 through contact 1CR1 and contact 46b across conductors 38a and 38b. Contact 44a closes to energize the operating coil of relay 2CR in parallel with timer 44. Contact 2CR1 causes energization of the operating coil of contactor M through switch 34 and its contact 34b. Contacts M1, M2 and M3 close to energize motor 18 and to start pump 32. Timer 44 is preset to maintain operation of motor 18 for an initial predetermined time interval of the order of fifteen minutes by maintaining contact 44a closed for this period of time.

When pump 32 causes oil to flow past the tip of probe 24, thermistor 26 is cooled by the oil to reduce its temperature and to increase its electrical resistance. It will be apparent that the reciprocating pump sends pulsations of oil past the probe tip to cause a correspondingly alternating operating voltage to be applied across the baseemitter junction of transistor TR1. Each positive excursion of this voltage renders transistor TR1 conducting to complete a discharge path therethrough and through resistor R7 for capacitor C4 to prevent the latter from charging sufficiently to operate transistor TR2. As a result, transistor TR3 is maintained non-conducting and the operating coil of relay 1CR energizes in the aforementioned circuit. Contact 1CR2 closes to complete a maintaining circuit for the operating coil of relay 2CR through contact 2CR2. Contact 1CR1 opens to interrupt the original energizing circuit of timer 44. However, timer 44 is maintained energized through its contact 44a and contacts 2CR2 and 1CR2 as long as contact 44a remains closed.

At the end of the initial fifteen minute time period, timer 44 opens contact 44a to deenergize and stop the timer. Thus, control of motor 18 has been transferred from timer 44 to relay 1CR of the pump-off control circuit.

Motor 18 is maintained energized and pumping continues under the control of the pump-off control circuit as long as there is sufficient oil in the well for pump 32 to maintain a predetermined volume of pulsating flow past the probe comprising thermistor 26. When the flow pulses decrease below such predetermined value, for example, to a small or negligible value, the positive excursions of the operating voltage pulses applied to base B of transistor TR1 proportionately decrease in amplitude and duration. As a result, transistor TR1 conducts for shorter periods or ceases conduction altogether and capacitor C4 accumulates a charge to render transistor TR2 conducting. Conduction of transistor TR2 causes transistor TR3 to conduct thereby to shunt the operating coil of relay 1CR and to deenergize the latter. Contact 1CR1 closes to reenergize timer 44 thereby to start operation of the latter. Immediately after closure of contact 1CR1, contact 1CR2 opens to interrupt the maintaining circuit of the operating coil of relay 2CR. Contact 2CR2 opens another point in the maintaining circuit of its operating coil. Contact 2CR1 interrupts energization of the operating coil of contactor M to open its contacts M1, M2 and M3 and to stop the pump motor.

Timer 44 now times a preset time interval constituting the recovery time of the well. At the end of such time interval, timer 44 closes contact 44a to start another pumping cycle. It will be apparent that during each pumping cycle, the pump runs until pump-off occurs and that these running times may vary. Timer 44 is stopped at the end of the initial fifteen minute period when control is transferred to the pump-off control circuit and remains stopped until pump-off occurs. When pump-off occurs, timer 44 is restarted to time the well recovery time. And at the end of such recovery time period, another pumping cycle is initiated.

Alternatively, switch 50 may be closed to provide a time interval between the opening of contact 1CR2 and the deenergization of the operating coil of relay 2CR. This time interval prevents the pump from being stopped in the event gas or the like in the oil causes intermittent deenergization of the operating coil of relay 1CR for periods less than one minute or the like. Closure of switch 50 completes the aforementioned energizing circuit for timer 48. Contact 50a of switch 50 connects normally closed contact 48a of timer 48 in shunt of contact 1CR2 of relay 1CR.

Connection of power causes energization of timer 44 through contacts 1CR1 and 46b across conductors 38a and 38b. Contact 44a closes to energize the operating coil of relay 2CR and to start the pump as hereinbefore described. Auxiliary timer 48 energizes from the secondary winding of transformer 52 through contacts 50b and 1CR1. Contact 2CR2 completes a self-maintaining circuit through contacts 48a and 50.

When oil pulsations start to flow past the probe tip, the operating coil of relay 1CR is energized as hereinbefore described to close contact 1CR2 and to open contact 1CR1. Contact 1CR2 completes another maintaining circuit for the operating coil of relay 2CR. Contact 1CR1 interrupts the original energizing circuit of timer 44. However, timer 44 is maintained energized through its contact 44a and contact 2CRT and then in two branches through contact 1CR2 and through contacts 48a and 50a to conductor 38b. Contact 1CR1 also interrupts the circuit for timer 48 to cause the latter to reset.

At the end of the initial fifteen minute time period, timer 44 opens contact 44a to deenergize and stop the timer. The secondary winding of transformers 36 and 52 are phased so that timer 44 is not maintained energized through contact 46b, the secondary winding of transformer 52, timer 48 and contact 50b after contact 44a opens. Thus, control of motor 18 has been transferred from timer 44 to relay 1CR of the pump-off control circuit.

In the event gas bubbles in the oil cause intermittent deenergization of the operating coil of relay 1CR to close contact 1CR1 and to open contact 1CR2, the operating coil of relay 2CR remains energized through contacts 48a and 50a in shunt of contact 1CR2 and then through contact 2CR2. Closure of contact 1CR1 causes energization of timer 48 to start the same timing. When oil flow causes reenergization of the operating coil of relay 1CR before the end of the time interval of the order of one minute, contact 1CR2 recloses to maintain relay 2CR and contact 1CR1 reopens to reset timer 48.

When pump-off occurs and the operating coil of relay 1CR deenergizes and remains deenergized, contact 1CR1 closes to reenergize timer 44 thereby to start operation of the latter. Contact 1CR1 also energizes auxiliary timer 48 to start the latter timing. Immediately after closure of contact 1CR1, contact 1CR2 opens the aforementioned maintaining circuit of the operating coil of relay 2CR. However, relay 2CR is maintained through contacts 48a, 50a and 2CR2. At the end of the time interval of timer 48, contact 48a opens to interrupt the maintaining circuit of the operating coil of relay 2CR to deenergize the latter and to stop the pump. Timer 44 then times the well recovery time as hereinbefore described and starts another pumping cycle.

Under either method of operation, that is, program clock initiation or definite recovery time operation, the sensitivity of the pump-off control circuit may be adjusted at potentiometer P. As the input signal voltage is affected by the stroke and speed of the pump and a longer stroke and greater speed provides a greater input signal, changes in such stroke and speed may require a sensitivity adjustment. To increase the sensitivity, the movable tap of potentiometer P is moved in the clockwise direction and to decrease the sensitivity, the movable tap is moved in the counterclockwise direction.

Pump-off control system 42 incorporates fail-safe means whereby the pump is stopped in the event of failure of certain circuit components therein. For example, in the event the coil of relay 1CR burns out, contact 1CR2 opens to stop the pump. If transistor TR2 or TR3 loses control and conducts continuously, relay 1CR causes the pump to stop. In the event the circuit of thermistor 26 opens, capacitor C3 charges and discontinues current flow therethrough to turn transistor TR1 off thereby to stop the pump.

*Manual Operation*

For manual operation, movable contact 34a of switch 34 is turned to contact 34c to energize the operating coil of contact M. This causes closure of contacts M1, M2 and M3 to energize motor 18 and to start the pump. To stop the pump, switch 34 is turned to disconnect the movable contact thereof from contact 34c thereby to deenergize contactor M and the pump motor. While switch 34 has been illustrated as having only one level of stationary contacts, it will be apparent that additional levels can be provided therefor to disconnect power from the primary windings of transformers 36 and 52 under manual operation and to reconnect such power under automatic operation.

We claim:

1. In a control system for an electric motor driven pump of the reciprocating type wherein electroresponsive means are arranged to control operation of the pump driving motor, the improvement comprising timing means presettable to control upon initiation of operation thereof said electroresponsive means to initiate operation of the pump driving motor, the reciprocating pump when so driven causing pulsating fluid flow, and pump-off control means operable to control the electroresponsive means to control operation of the pump driving motor under the control of said pulsating fluid flow, said pump-off control means comprising fluid pulse detecting means subjected to said fluid pulsations to afford a pulsing input control signal proportional to the fluid pulses, and alternating current responsive means operable in response to said input control signal pulses when they are above a predetermined value indicative of substantial fluid flow for transferring control of said electroresponsive means to said pump-off control means following the initiating function of said timing means, said pump-off control means thereafter maintaining control of said electroresponsive means to continue operation of the pump driving motor, and said alternating current responsive means comprising means responsive to decrease of said input control signal pulses below said predetermined value indicative of insufficient fluid flow for operating the electroresponsive means to discontinue operation of the pump driving motor and to transfer control of the electroresponsive means back to said timing means.

2. The invention defined in claim 1, wherein the last mentioned means comprises auxiliary timing means responsive to decrease of said input control signal pulses below said predetermined value for timing a predetermined time interval, and means responsive to said auxiliary timing means at the end of said time interval for operating the electroresponsive means to discontinue operation of the pump driving motor and to transfer control of the electroresponsive means back to the first mentioned timing means, the time interval of said auxiliary timing means being sufficient to prevent interruption of the pump driving motor in response to intermittent decrease of said input control signal pulses caused by gas in the oil or the like.

3. The invention defined in claim 1, wherein said fluid pulse detecting means comprises electrically heated resistance means mounted in a sealed probe that is subjected to the pumped fluid, and said resistance means having a negative temperature coefficient of resistance to afford an output signal when cooled by the fluid pulses.

4. The invention defined in claim 3, together with a conduit through which said fluid is pumped, a fluid trap in said conduit, and said probe being mounted on the fluid exit side of said fluid trap to extend into the interior of the fluid trap portion of said conduit for contact with the fluid pulsations flowing therein.

5. The invention defined in claim 4, wherein said fluid trap comprises a U-shaped portion in said conduit, and said probe being mounted in the lower bend in the exit side of said U-shaped portion.

6. The invention defined in claim 5, wherein said conduit extends from the upper end of an oil well casing, and said U-shaped portion is located immediately adjacent said oil well casing.

7. The invention defined in claim 1, wherein said alternating current responsive means comprises an electrical energy storage device, means for normally storing energy in said device, means responsive to each input control signal pulse for causing discharge of energy from said device in proportion to the magnitude of each such pulse, means responsive to decrease of said energy in said device below a predetermined value for maintaining operation of said electroresponsive means following said initial operation thereof to continue operation of the pump driving motor, and the last mentioned means being responsive to increase of said energy in said device above said predetermined value for operating said electroresponsive means to discontinue operation of the pump driving motor and to transfer control of said electroresponsive means back to said timing means.

8. In a control system for an electric motor driven pump of the reciprocating type, electroresponsive means arranged to control operation of the pump driving motor, means for controlling said electroresponsive means to afford intermittent pumping cycles, said controlling means comprising timer means presettable to control said electroresponsive means initially to operate the pump driving motor at the beginning of each of a plurality of successive timed cycle periods, the reciprocating pump when so driven causing pulsating fluid flow, and pump-off control means responsive to the pulsating fluid flow for controlling said electroresponsive means to maintain operation of the pump driving motor continuously following each said initial operation of the latter, said timer means comprising means for transferring control of said electroresponsive means from said timer means to said pump-off control means after fluid has started to flow during each said initial operation of the pump driving motor, said pump-off control means comprising means for detecting fluid flow pulsations and for controlling said electroresponsive means to maintain operation of the pump driving motor continuously following each said initial operation of the latter as long as such pulsations have a magnitude indicative of substantial fluid flow, and means responsive to said detecting means detecting fluid flow pulsations of a magnitude indicative of negligible fluid flow during each said pumping cycle for controlling said electroresponsive means to discontinue operation of the pump driving motor and for transferring control of said electroresponsive means back to said timer means, and said timer means being operable following each such discontinuance of pump driving motor operation and transfer of control back to said timer means and in accordance with the setting of said timer means to control said electroresponsive means to reoperate the pump driving motor to start another pumping cycle.

9. The invention defined in claim 8, wherein said timer means is connected to a power supply source for continuous operation, and said timer means is preset to energize said electroresponsive means to initiate operation of the pump driving motor at the beginning of each of successive timed cycle periods which are usually longer than any pumping periods during which sufficient fluid is available to maintain such substantial fluid flow.

10. The invention defined in claim 8, wherein said timer means is normally connected to a power supply source for energization, and said timer means is preset to reenergize said electroresponsive means to initiate reoperation of the pump driving motor at the end of each predetermined timed interval following each said transfer of control from said timer means to said pump-off control means, and said detecting and controlling means comprises means for interrupting energization of said timer means during the interval between said transfer of control to said pump-off control means and said discontinuance of operation of the pump driving motor whereby said timer means is inactive during this interval and becomes effective after each such interruption to time said predetermined time interval from each time that pumping is discontinued.

11. The invention defined in claim 8, wherein said timer means comprises a timing device and a switch, means connecting said timer switch in circuit with said electroresponsive means, means for connecting said timing device to a power supply source for continuous operation, said timing device being presettable to cause closure of said timer switch to energize said electroresponsive means for periodic initial timed intervals to initiate said plurality of successive cycle periods and to cause reopening of said timer switch at the end of each said initial timed interval, means responsive to each said energization of said electroresponsive means for causing operation of the pump driving motor to effect said pulsating fluid flow during said initial interval when sufficient fluid is available for pumping, said controlling means in said pump-off control means comprising switch means for establishing a maintaining circuit in shunt of said timer switch during said initial timed interval for maintaining energization of said electroresponsive means following reopening of said timer switch, said establishment of said maintaining circuit and said reopening of said timer switch constituting a transfer of control of sad electroresponsive means to said pump-off control means, said detecting and controlling means causing operation of said switch means to interrupt said maintaining circuit to deenergize said electroresponsive means in response to detection of said negligible fluid flow, said interruption of said maintaining circuit constituting a transfer of control of said electroresponsive means back to said timer means, and said timing device being operable following each such transfer of control back thereto and in accordance with the setting of said timing device to cause reclosure of said timer switch to effect reenergization of said electroresponsive means and to initiate another pumping cycle.

12. The invention defined in claim 11, wherein said controlling means in said pump-off control means further comprises auxiliary timing means having a normally closed contact for establishing a maintaining circuit in shunt of said switch means during said initial time interval for maintaining energization of said electroresponsive means following operation of said switch means and interruption of the first mentioned maintaining circuit, and said switch means comprises a contact for energizing said auxiliary timer when said first mentioned maintaining circuit is interrupted to time a predetermined time interval, said time interval being sufficient to prevent interruption of the pump driving motor if said detecting and controlling means intermittently interrupts said first mentioned maintaining circuit in response to gas in the fluid or the like, and said auxiliary timing means being effective at the end of its time interval to open its contact to interrupt said shunt circuit and to deenergize said electroresponsive means to stop the pump driving motor.

13. The invention defined in claim 8, wherein said timer means comprises a timing device and a switch, means connecting said timer switch in circuit with said electroresponsive means, means for connecting said timing device to a power supply source for operation, said timing device being presettable to cause closure of said timer switch to energize said electroresponsive means for periodic initial timed intervals at the beginning of the respective timed cycle periods to initiate said plurality of successive cycle periods and to cause reopening of said timer switch at the end of each said initial timed interval, means responsive to each said energization of said electroresponsive means for causing operation of the pump driving motor to effect said pulsating fluid flow during said initial timed interval when sufficient fluid is available for pumping, said controlling means in said pump-off control means comprising first switch means for establishing a maintaining circuit in shunt of said timer switch during said initial timed interval for maintaining energization of said electroresponsive means following reopening of said timer switch and a maintaining circuit through said timer switch for said timing device, and second switch means thereafter operable for interrupting the original energizing circuit for said electroresponsive means, opening of said timer switch causing interruption of said timing device, said establishment of said maintaining circuit and said interruption of operation of said timing device constituting a transfer of control of said electroresponsive means to said pump-off control means, said detecting and controlling means causing operation of said first switch means to interrupt said maintaining circuit to deenergize said electroresponsive means in response to detection of said negligible fluid flow and thereafter causing operation of said second switch means to effect reoperation of said timing device, said interruption of said maintaining circuit and said reoperation of said timing device constituting a transfer of said control of said electroresponsive means back to said timer means, and said timing device being operable following each such transfer of control back thereto and in accordance with the setting of said timing device to time the remainder of each said timed cycle period and to cause reclosure of said timer switch at the end of each said cycle period to effect reenergization of said electroresponsive means and to initiate another pumping cycle.

14. The invention defined in claim 13, wherein said controlling means in said pump-off control means further comprises auxiliary timing means having a normally closed contact for establishing a maintaining circuit in shunt of said first switch means during said initial time interval, said shunt circuit being effective to maintain energization of said electroresponsive means following operation of said first switch means and interruption of the first mentioned maintaining circuit, said second switch means being effective to energize said auxiliary timing means to time a predetermined time interval simultaneously with said reoperation of said timing device, the time interval of said auxiliary timing means being sufficient to prevent interruption of the pump driving motor if said detecting and controlling means intermittently interrupts said first mentioned maintaining circuit in response to gas in the fluid or the like, and said auxiliary timing means being effective at the end of its time interval to open its contact to interrupt said shunt circuit and to deenergize said electroresponsive means to stop the pump driving motor.

15. The invention defined in claim 8, wherein said detecting and controlling means comprises a thermistor device mounted for immersion in the pulsating fluid flow, electrical means for normally heating said thermistor above the temperature of the fluid whereby said thermistor is subjected to alternate cooling and reheating by the fluid pulsations to afford an alternating input signal proportional to and indicative of the volume of fluid flow, means for detecting such alternating input signal indicative of volumetric fluid flow above and below a predetermined value, and means responsive to said input signal detecting means for controlling said electroresponsive means.

16. The invention defined in claim 15, together with a conduit through which said fluid is pumped, a fluid trap comprising a U-shaped section in said conduit, and a sealed probe mounted in the fluid exit side of said trap for containing said thermistor, and said thermistor being in good thermal conducting relation with the tip of said probe.

17. The invention defined in claim 16, wherein said conduit extends from the upper end of an oil well casing for conveying oil pumped from the well, and said trap is located immediately adjacent said oil well casing.

18. In an oil well pump-off control system for controlling an electric motor driven pump of the reciprocating type to pump oil from a well during productive intervals when oil is available for pumping at a sufficient volumetric rate and for discontinuing pumping during alternate non-productive intervals when insufficient oil is available to maintain such pumping rate and to afford time for well recovery during such non-productive intervals, each timed cycle including a pumping interval and a recovery interval being constant in length, an oil conduit extending from the well head, a check valve in said conduit, an oil trap comprising a U-shaped section in said oil conduit between the well head and said check valve, oil volumetric flow sensing and measuring means comprising an electrically heated thermistor extending into said oil trap to be subjected to the oil pulsations produced by the reciprocating pump and dissipating heat to the oil to afford a pulsing input control signal proportional to the oil pulsations, electroresponsive means energizable to cause operation of the pump driving motor, and program clock initiating means for controlling said electroresponsive means to cause pumping during said productive intervals and to discontinue pumping after each such productive interval for the remainder of each said cycle, said control means comprising timer means operable in response to initiation of operation thereof to run continuously and being preset to complete an energizing circuit to said electroresponsive means for an initial timed interval at the beginning of each said cycle sufficient to insure oil flow past said sensing means, and pump-off control means responsive to said pulsating input control signal for completing a maintaining circuit for said electroresponsive means in shunt of said timer means to maintain energization of said electroresponsive means following interruption of the original energizing circuit thereof at the end of said initial time interval for the duration of each productive interval, said pump-off control means being operative to interrupt said maintaining circuit at the end of each productive interval to discontinue pumping, and said continuously running timer means being operative in accordance with its setting to reestablish said original energizing circuit at the end of the remaining recovery interval of each said cycle to start another similar cycle.

19. In an oil well pump-off control system for controlling an electric motor driven pump of the reciprocating type to pump oil from a well during productive intervals when oil is available for pumping at a sufficient volumetric rate and for discontinuing pumping during alternate non-productive intervals when insufficient oil is available to maintain such pumping rate, said productive intervals being variable requiring timing of alternate non-productive intervals to afford sufficient time for well recovery after each pumping interval, an oil conduit extending from the well head, a check valve in said conduit, an oil trap comprising a U-shaped section in said conduit between the well head and said check valve, oil volumetric flow sensing and measuring means comprising an electrically heated thermistor extending into said oil trap to be subjected to the oil pulsations produced by the reciprocating pump and dissipating heat to the oil to afford a pulsing input control signal proportional to the oil pulsations, electroresponsive means energizable to cause operation of the pump driving motor, and definite recovery time operation control means for controlling said electroresponsive means to cause pumping during said productive intervals and to discontinue pumping after each such productive interval for a predetermined timed well recovery period, said control means comprising timer means having an energizing circuit and being preset to complete upon energization thereof an energizing circuit to said electroresponsive means for an initial timed interval sufficient to insure oil flow past said sensing means and to interrupt said circuit from the end of said initial timed interval for a timed well recovery period and cyclically to repeat such completion and interruption of said energizing circuit and pump-off control means responsive to said pulsing input control signal for completing maintaining circuits for said electroresponsive means and for said timer means to maintain energization of said electroresponsive means following interruption of the original energizing circuit therefor at the end of said initial time interval for the duration of each productive interval and to maintain energization of said timer means for said initial time interval, switch means responsive to completion of said maintaining circuits for interrupting the original energizing circuits to said timer means and said electroresponsive means, said timer means being operative at the end of said initial time interval to interrupt its maintaining circuit to stop timing, said pump-off control means being operative to interrupt the maintaining circuit to said electroresponsive means at the end of said productive interval in response to decrease in the pumping rate below a predetermined value thereby to discontinue pumping, said switch means being operative in response to interruption of the maintaining circuit to said electroresponsive means for reestablishing the original energizing circuit to said timer means to restart the latter to time said well recovery interval.

20. In a variable condition responsive system for controlling a load, a condition responsive device having a variable alternating current output signal proportional to the variation in an external condition, a controllable semi-conductor device having a main conduction path and a control element, means comprising capacitive means coupling said condition responsive device to said control element to control conduction in said main conducting path in accordance with the variation in said alternating current signal, a storage capacitor, means connecting said storage capacitor across a power supply source for timed charging, means comprising said main conduction path for discharging said storage capacitor, a load connected for energization across said power supply source, and semi-conductor means controlled by the charge on said storage capacitor for shunting said load to deenergize the same.

21. In a variable condition responsive system for controlling a load, an electrically heated thermistor for providing an alternating current control signal voltage proportional to the variation in an external temperature condition, a transistor having a main conduction path connected to a power supply source and a control element, means comprising a capacitor coupling said thermistor to said control element to control conduction in said main conduction path in accordance with the variation in said signal voltage, a storage capacitor, means connecting said storage capacitor across said power supply source for timed charging, means comprising said main conduction path for discharging said storage capacitor under the control of said signal voltage, a load normally energizable across said power supply source, and semi-conductor control means controlled by the charge on said storage capacitor for shunting said load to deenergize the same when said signal voltage decreases below a predetermined value.

22. In a variable temperature responsive system for controlling a load, said load being connected to be normally energized across a power supply source, semi-conductor control means for shunting said load to deenergize the same, a storage capacitor, means connecting said storage capacitor across said power supply source normally to charge at a timed rate, means connecting said storage capacitor to control said semi-conductor control means to shunt said load whenever the charge thereon reaches a predetermined value, a transistor having a main conduction path forming a discharge circuit for said storage capacitor to discharge the latter in accordance with the conduction of said transistor, said transistor further having a control element for controlling conduction thereof, an electrically heated thermistor subjected to fluid pulsations and dissipating heat thereto to provide a pulsing control signal voltage proportional to the fluid pulses, and means comprising a capacitor coupling said thermistor to said control element to control conduction of said transistor to maintain said storage capacitor discharged when the fluid pulsations are above a predetermined value thereby to maintain the load energized, and said storage capacitor charging to control said semi-conductor means to shunt said load to deenergize the latter when said fluid pulsations are below said predetermined value.

References Cited in the file of this patent
UNITED STATES PATENTS

| | | |
|---|---|---|
| 2,326,442 | De Wit | Aug. 10, 1943 |
| 2,339,487 | King | Jan. 18, 1944 |
| 2,550,093 | Smith | Apr. 24, 1951 |
| 2,707,440 | Long | May 3, 1955 |
| 2,947,931 | Hubby | Aug. 2, 1960 |